United States Patent
Frosini et al.

(10) Patent No.: US 6,893,208 B2
(45) Date of Patent: May 17, 2005

(54) DRAINAGE SYSTEM FOR GAS TURBINE SUPPORTING BEARINGS

(75) Inventors: Franco Frosini, Sesto Fiorentino (IT); Andrea Signori, Chiazzano (IT)

(73) Assignee: Nuovo Pigone Holdings S.p.A., Florence (IT)

(*) Notice: Subject to any disclaimer, the term of this patent is extended or adjusted under 35 U.S.C. 154(b) by 0 days.

(21) Appl. No.: 10/312,845

(22) PCT Filed: Jun. 29, 2001

(86) PCT No.: PCT/EP01/07445
§ 371 (c)(1),
(2), (4) Date: Aug. 25, 2003

(87) PCT Pub. No.: WO02/02913
PCT Pub. Date: Jan. 10, 2002

(65) Prior Publication Data
US 2004/0037696 A1 Feb. 26, 2004

(30) Foreign Application Priority Data
Jul. 3, 2000 (IT) .................... MI2000A1493

(51) Int. Cl.[7] .............................. F01D 11/00
(52) U.S. Cl. .................. 415/112; 184/6; 60/39.08
(58) Field of Search ............ 415/110–113, 168–170 R, 415/180; 184/6, 11, 104 B, 1.2, 6.23, 6.11, 1.5; 60/39.08

(56) References Cited

U.S. PATENT DOCUMENTS

| 4,046,223 A | | 9/1977 | McHugh | |
|---|---|---|---|---|
| 4,152,032 A | * | 5/1979 | Pierpoline et al. | 384/131 |
| 4,170,873 A | | 10/1979 | Milo | |
| 4,235,484 A | | 11/1980 | Owen et al. | |
| 4,477,223 A | * | 10/1984 | Giroux | 415/168.2 |
| 4,741,630 A | | 5/1988 | Oeynhausen et al. | |
| 4,844,201 A | | 7/1989 | Ackerman | |
| 5,636,848 A | * | 6/1997 | Hager et al. | 277/420 |
| 5,749,660 A | * | 5/1998 | Dusserre-Telmon et al. | 384/475 |
| 5,975,157 A | * | 11/1999 | Ashford | 141/98 |
| 6,000,701 A | * | 12/1999 | Burgess | 277/412 |
| 6,327,857 B1 | * | 12/2001 | Fredriksson | 60/605.3 |
| 6,565,095 B2 | * | 5/2003 | Meacham | 277/408 |

\* cited by examiner

Primary Examiner—Edward K. Look
Assistant Examiner—James M. McAleenan
(74) Attorney, Agent, or Firm—Nixon & Vanderhye

(57) ABSTRACT

A drainage system for gas turbine supporting cushions or bearings, in particular for the second supporting bearing, consisting of a central shaft (20), surrounded by a series of supporting studs (21), which result, in their turn, with connection to a container housing (22) for studs (21), a sleeve (23) for containing the second supporting bearing of the turbine and a series of pipes (24, 25), respectively for the entry and drainage of the lubrication and cooling oil; the system consists of, in addition, a series of lateral seals (26), provided in positions facing the second supporting bearing, which create a pressure difference which permits the oil to pass under pressure within the drainpipes (25) at a well sustained speed.

4 Claims, 4 Drawing Sheets

DRAINAGE SYSTEM FOR GAS TURBINE SUPPORTING BEARINGS

This invention refers to a drainage system for the supporting bearings of a gas turbine.

A gas turbine is normally defined as a rotating thermal machine, which converts heat into work, using gas directly provided from a combustion and which supplies mechanical power on a rotating shaft.

It generally consists of a compressor or turbo compressor, normally the axial type, within which is carried under pressure air arriving from the exterior.

Further, various injectors supply the fuel, which is mixed with air in order to form an air-fuel injection mix.

The axial compressor is controlled by a dedicated turbine, which supplies mechanical power to a utiliser transforming the enthalpy of the gas fuel within the combustion chamber.

The dedicated turbine, the turbocompressor, the combustion chamber (or boiler), the mechanical power output shaft, the control system and the starting system constitute the essential parts of a gas turbine plant.

With regard to the functioning of a gas turbine, it is to be noted that the flow penetrates into the compressor through a series of inlet pipes.

In this channelling, the gas presents characteristics of low pressure and low temperature, while, in passing through the compressor, the gas is compressed and its temperature increases.

This then penetrates into the combustion chamber (or the boiler chamber), where it is subjected to a further increase in temperature.

The heat necessary for the increase in temperature of the gas is supplied from the combustion of liquid fuel introduced into the boiler chamber, through the injectors.

The ignition of the fuel, on the start-up of the machine, is obtained through spark plugs.

On leaving the combustion chamber, the gas, at high-pressure and at high temperature, through apposite pipes, arrives at the turbine, where it releases part of the energy accumulated in the compressor and in the heating chamber (combustion chamber) and then flows to the exterior through the exhaust channelling.

Because the work transferred by the gas to the turbine is greater than that absorbed in the compressor, there remains available, on the shaft of the machine, a certain quantity of energy, which, less the work absorbed by the accessories and by the passive resistance of the mechanical components in movement, constitutes the useful work of the plant.

From the design point of view, the blades of the axial compressor and of the turbine are mounted on a single shaft, which is supported by two bearings, generally produced in two half shells meeting in a horizontal plane.

A noted and widespread layout of the supporting bearings provides a first bearing situated at the entry of the compressor, while a second bearing is positioned between the axial compressor and the turbine, this design is extremely robust and resistant.

In this case, however, the second support bearing must be installed within a cylindrical space provided around the portion of the shaft existing between the axial compressor and the turbine.

Figure 1:
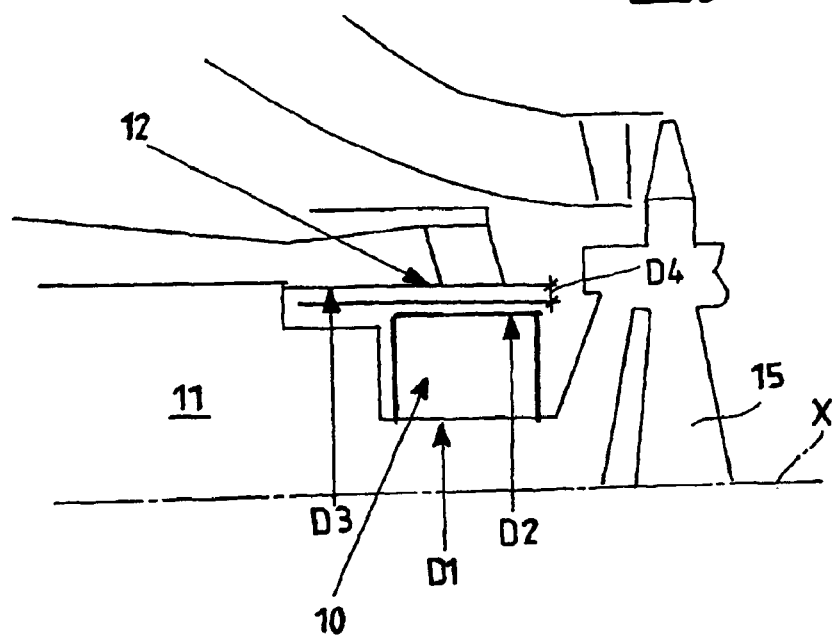

By way of simplification, FIG. 1 attached to this description makes reference to a schematic and partial view of a gas turbine plant of the traditional type.

As clearly represented in the figure, the external diameter D2 of the cylindrical space 10 for the containment and the installation of the second support bearing (having a diameter D1) is imposed by the internal diameter D3 of the diffuser, which is provided at the output of the axial compressor 11 and before the dedicated turbine 15, reduced by the thickness D4 of the sleeve 12.

The container or sleeve 12 must be rigid and assure the containment of high pressure air and is part of a housing which must support the principal components of the combustion system (burners, other mechanical components in movement) and be resistant to the high temperature, which is produced within and around it.

Finally, the internal diameter D1 of the second supporting bearing of a known gas turbine is imposed from the diameter of the shaft which carries the blades of the compressor 11 and of the turbine 15, the mid-axle of which is indicated in FIG. 1 with the reference X.

Further, the positioning of the supporting bearing is decidedly critical with regard to the utilisable space available for the layout of the bearing container itself and the service connections, such as the piping in which runs the lubrication oil and the devices for retaining the air.

In effect, the pipes in which the lubricating oil runs must be installed in a way which will connect the various chambers, separated by the walls of the inner barrel, in which there is a notable difference in pressure.

In addition, their connectors must be extremely secure and maintained leak free, in a way which excludes any possibility of loss of oil to the exterior, which could provoke dangerous fires.

At the same time, however, the overall dimensions of the second support bearing must be sufficiently large, in order to confer to the axle of the turbine the required rigidity.

The problem of the complexity of the available space and the fact of operation at high temperature are conditions which require the presence of an elevated flow of lubricating oil. The dimensions of the support bearings and the amount of play cause high losses of power and, in consequence, elevated flows of oil for lubrication and cooling.

In effect, in each case, it is always necessary to supply a greater flow of oil than that effectively required, with the intention of cooling the supporting bearing, otherwise its sleeve reaches an extremely high temperature.

In addition, it is necessary to provide a corresponding flow of air to the bearing sleeve and, therefore, to collect it again on the exterior, in a way which avoids an accumulation of hot air in the space provided around the bearing sleeve and to prevent the loss of lubricating oil through the end seals of the sleeve.

The air is injected in the container and the greater part of it must be newly collected externally with the lubricating oil.

The air present within the piping must be able to flow at low speed, in a way which facilitates the flow of the oil utilised for the purpose of lubrication and cooling of the supporting bearing and of the bearing sleeve.

However, such conditions may not be reached if there are significant losses relative to the geometric characteristics of the connected motor.

In fact, the external containment sleeves of the motors result in being, in this mode, very complicated and very costly to produce, with respect to such traditional conventions.

In spite of all this, currently, the piping is still being designed in order to obtain oil flows moved by gravity, with the aforementioned consequences of greater costs and less efficiency.

Alternatively, the lubrication and cooling fluids can be collected externally by means of an evacuation pump.

However, also in this case there are the consequent problems of cost and reliability.

The objective of this invention is, therefore, that of producing a drainage system for the supporting bearings of a gas turbine, which obviates the above mentioned inconveniences and, in particular, that of producing a drainage system for the supporting bearings of a gas turbine in a way which satisfies the requisites mentioned above with simplicity, economy, reliability and limited space.

Another objective of this invention is that of indicating a drainage system for the supporting bearings of a gas turbine, which permits an increase in the rotary speed of the turbine and the temperature/pressure relationship within the gas turbine.

These and other objectives, according to the invention, would be reached with a system of drainage for the support bearings of a gas turbine, of the type incorporating a central turbine shaft, surrounded by a series of means of support which result, in their turn, with attachment to a containment housing for the means of support, a sleeve containing at least one supporting bearing of the turbine and a plurality of pipes, respectively, for the entry and the drainage of lubrication and cooling oil, characterised by the fact of including, in addition, a series of lateral seals, provided in positions facing the supporting bearing, which create a difference in pressure which permits the oil to pass within the drainage pipes at a sustained speed.

The containment sleeve contains, further, a series of lateral chambers, a chamber for the accumulation of oil under pressure and connection openings between the lateral chambers and the oil drainage pipes; the accumulation chamber receives a portion of the flow, which is drained from the turbine by gravity, while, within the chamber, the oil reaching a level corresponding to a determined speed of flow, overflows into a drainage pipe.

The greater part of the fluid is confined within the accumulation chamber, which surrounds the containment sleeve of the support bearing, in a way in which the aforementioned accumulation chamber reaches an internal overpressure which produces an ejection of the fluid at high speed.

This phenomenon of ejection provokes the emission of jets of fluid corresponding to the predetermined portions of the elements attached to the central shaft itself, which overflows the motor fluid of the lateral chambers and provokes a consequent overflowing of fluid draining to the exterior.

In an advantageous manner, the drainage system for the supporting bearings of a gas turbine, in accordance with this invention, permits the reduction to a minimum of the dimensions of the sleeve containing the supporting bearings and of the relative piping of the gas turbine, optimising, at the same time, the possibility of extracting energy from the pressurised fluid present around the sleeve of the supporting bearing.

In addition, the drainage pipes will be positioned lower and substantially at the centre of the supporting bearings containment sleeve, in a way which reduces to a minimum the axial dimensions of the sleeve, with respect to the recognised manner.

Further, the radial dimensions will be reduced, with regard to the recognised manner, in so much as it is no longer necessary to install a fluid collection chamber, external to the system, in which to increase the level of the fluid and obtain potential energy sufficient to cancel out the loss of pressure in the inlet and outlet pipes and the fluido-dynamic resistance.

The characteristics and the advantages of the drainage system, in accordance with this invention, will be greater evidenced from the following description of a typical production, used as an example, but not in a limiting manner, referring to the attached schematic drawings in which:

FIG. 1 is a schematic representation of a traditional type gas turbine

Figure 2:
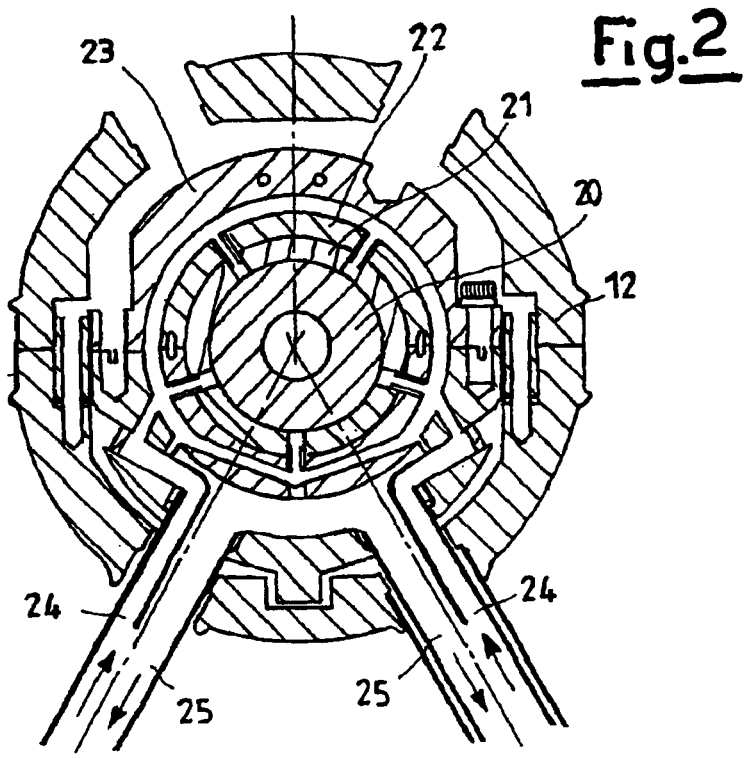
Figure 3:
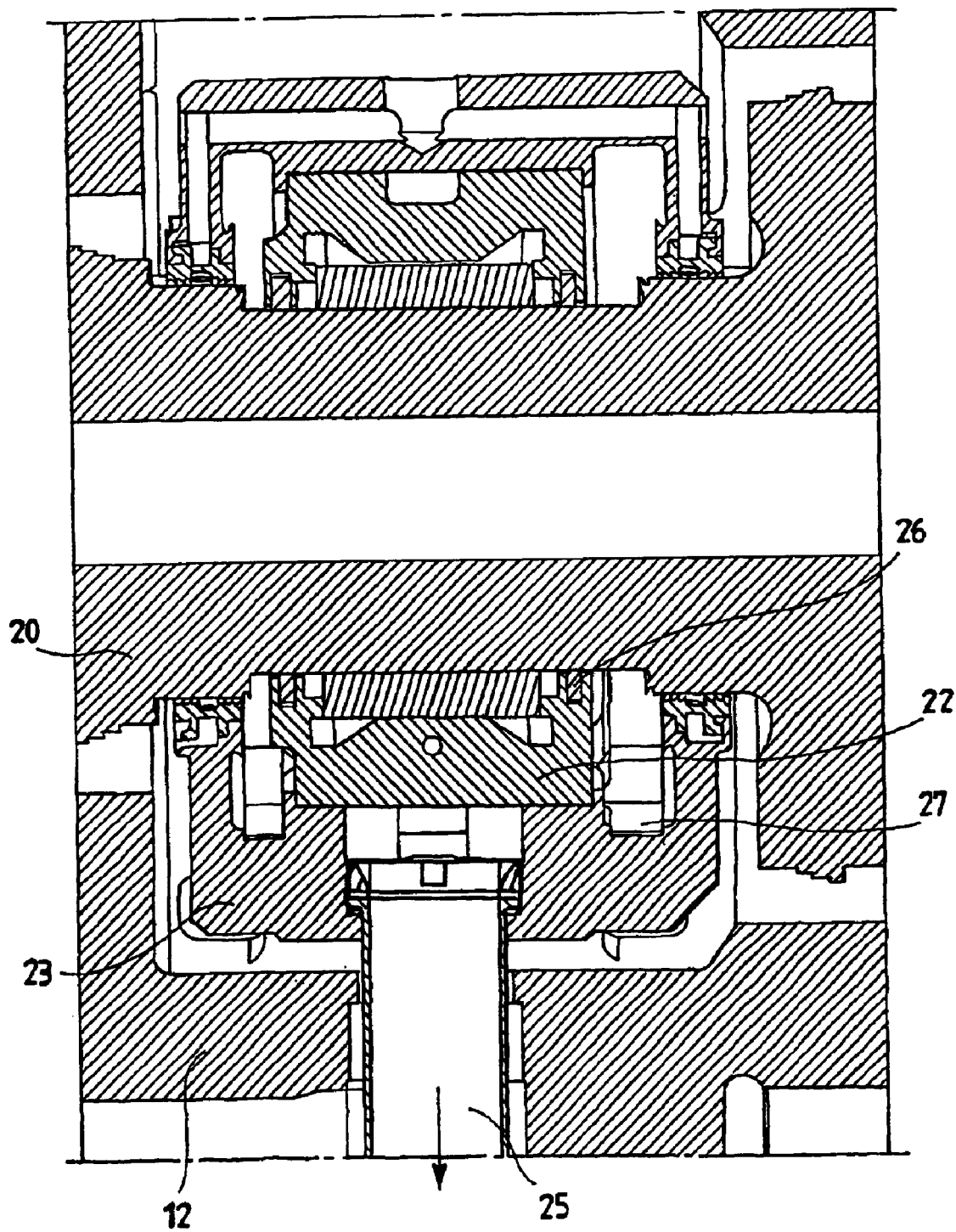
Figure 4:
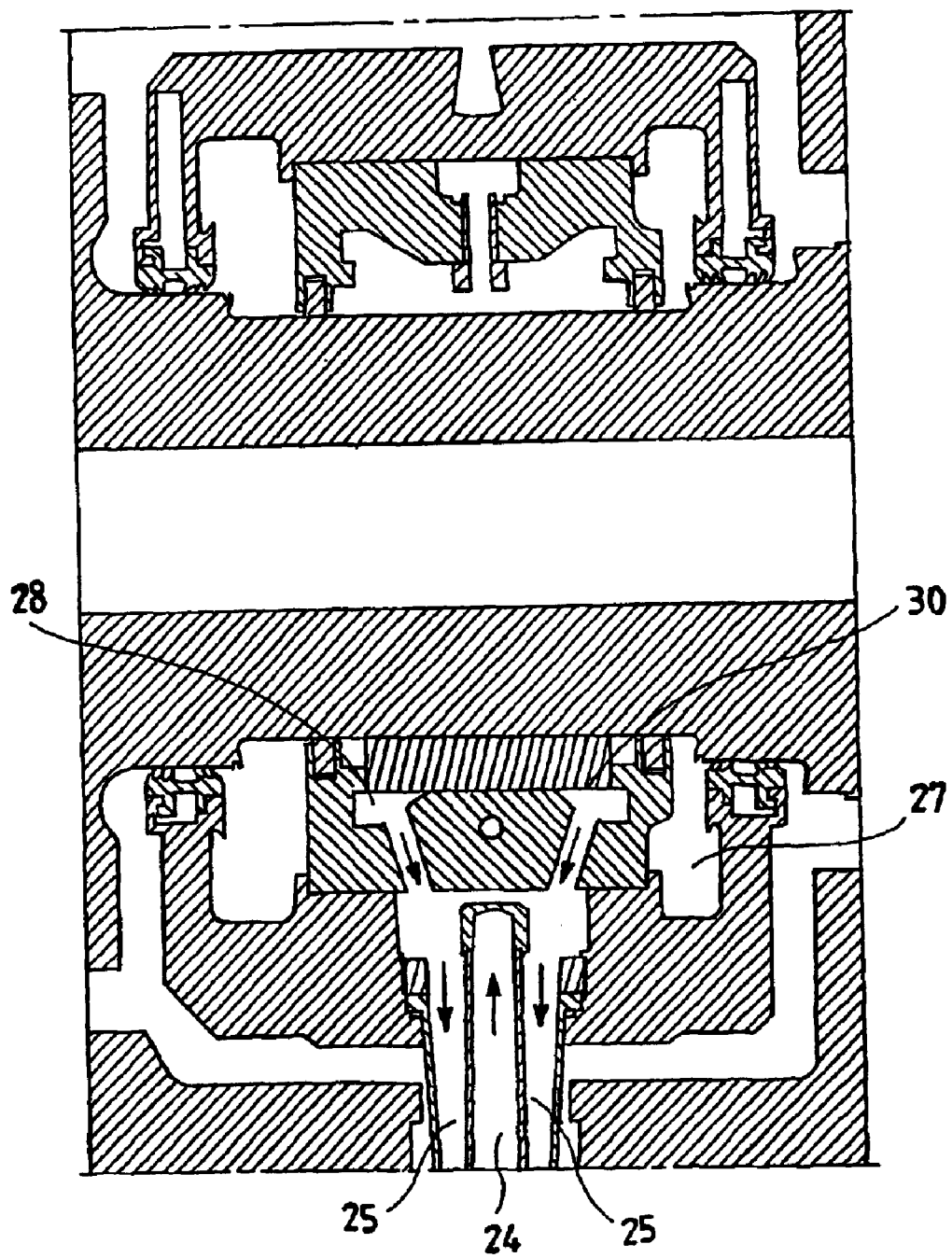
Figure 5:
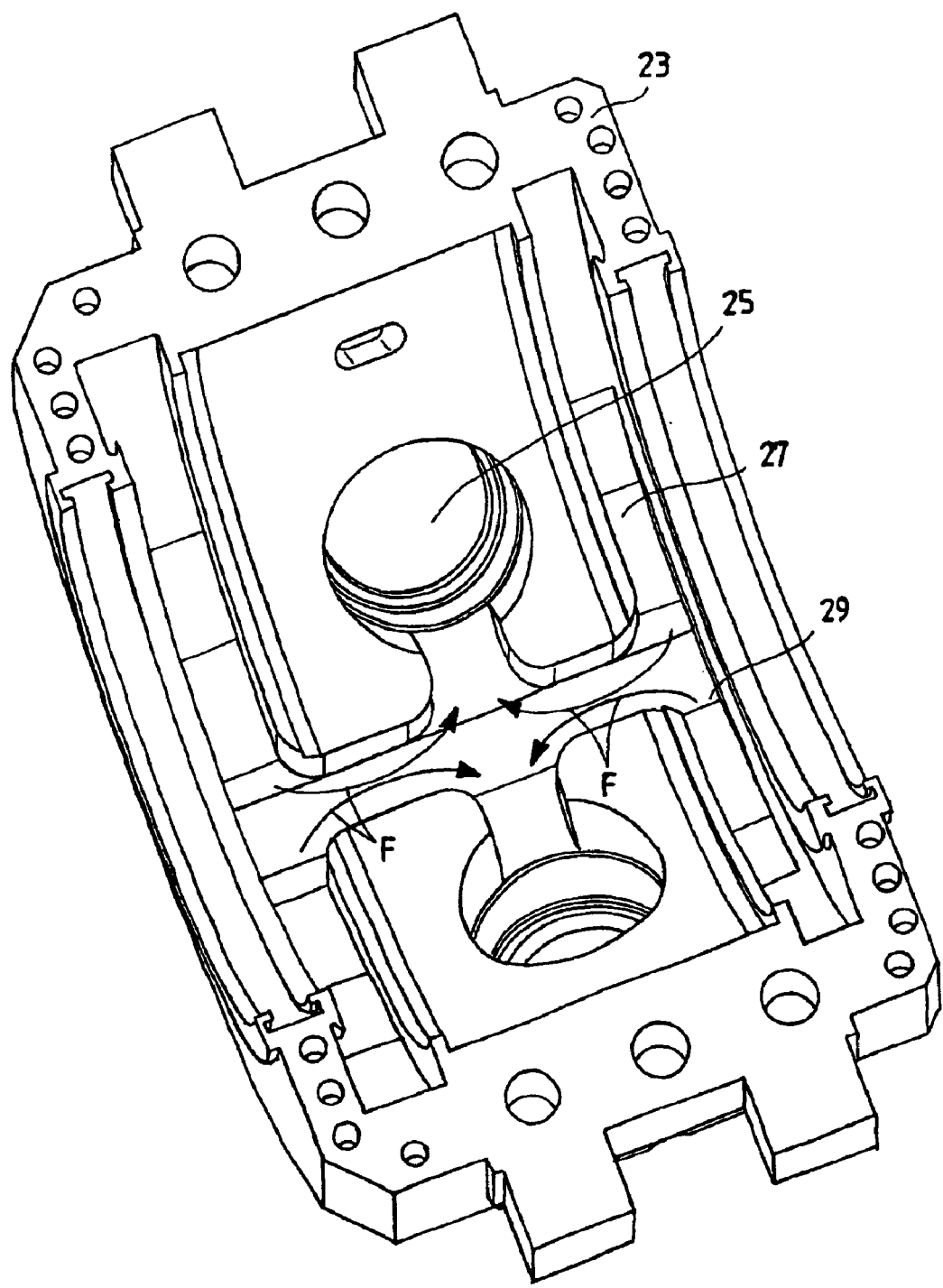

FIG. 2 is a transverse section of a supporting bearing associated with a central shaft and with an external 'inner barrel', according to the invention FIG. 3 is a longitudinal section of FIG. 2 made along a predetermined plane FIG. 4 is a longitudinal section of FIG. 2 made along a further plane FIG. 5 represents a prospective view of the sleeve of a second supporting bearing of a gas turbine, in accordance with this invention.

With particular reference to FIGS. 2–5, with 20 is indicated the central shaft of the gas turbine, with 21 a series of studs, attached to a housing for studs 22, which provides a closing or support function, with 23 is indicated a sleeve for containing a second supporting bearing of the turbine, while with 24 and 25 are indicated two pairs of pipes, respectively, for the entry and for the drainage of the lubrication and cooling oil.

In addition, with 26 is indicated generically the lateral seals, with 27 the lateral chambers, with 28 a chamber for the accumulation of oil under pressure, while with 29 is indicated the connection apertures between the lateral chambers 27 and the oil drain pipes 25.

According to this invention, it is the intention to allow to drain freely (only by the effect of gravity) only a portion of the lubricating oil, which is piped within an accumulation chamber 28 or collection basin, which is provided under the sleeve 23 of the second supporting bearing of the gas turbine.

Within the accumulation chamber 28, the level of the oil rises up to the point at which the speed of flow is such that it overflows into the drain pipe 25.

Therefore, the greater part of the oil is confined within a space which surrounds the containment structure of the supporting bearing.

The lateral seals 26 (which, in an example of preferred production and for illustration, but not in a limiting manner, are constituted from floating rings), are provided in positions facing the supporting bearing, creating an adequate pressure difference (in the direction of the collection system), in a way which permits the oil to flow directly into the drain pipes 25 at a substantially raised speed.

Thanks to the innovative form of the supporting bearing sleeve, represented schematically in FIG. 5, the system according to the invention utilises an overpressure existing within the space around the bearing, in order to obtain an ejection of oil at elevated speed and, therefore, obliging the oil present within the accumulation chamber 28 to flow into the drainage pipes 25.

In practice jets of oil are obtained corresponding to the portions 30 of FIG. 4 with the running of motor fluid or overflowing of the motor oil from the lateral chambers 27.

In this way, through a suitable study of the geometric structure of the components of the drainage system for supporting bearings, an important reduction in the dimensions of the piping was obtained, while the procedure of ejecting oil permitted a consequential overflowing of the other oil flows which flow in the turbine and overflow to the exterior by means of the force of gravity alone, it is worth saying that a quantity of oil which comes from the lateral ring seals 26 is a further quantity of oil which flows from the lateral chambers 27 for the purpose of cooling.

The directions in which the oil drains from the sleeve 23 of the supporting bearing are clearly represented in FIG. 5, by means of the arrows F.

Definitively, without utilising costly or complex components, such as external ejectors or evacuation pumps, it is possible to reduce to a minimum the dimensions of the turbine supporting bearing containment sleeve and the space of the relative piping. On the other hand, the fact of extracting energy from the pressurised oil present around the external sleeve of the bearing is optimised.

A further advantage is that the drainage pipes 25 are positioned lower and at the centre of the supporting bearing sleeve 23, which reduces the axial length of the sleeve to a minimum value, which itself is constituted from the sum of the axial length of the bearing and of the lateral seals 26 with the addition of two spaces corresponding to two narrow chambers positioned between the bearing and the seals 26.

On the other hand, utilising the drainage system in accordance with the invention will further reduce the radial dimensions because it is no longer necessary to provide for the installation of a container or collection basin external to the system, in which to increase the level of the oil and obtain the potential energy sufficient to cancel out the loss in the piping and the fluidodynamic resistance.

From the description given, the characteristics of the gas turbine supporting bearings drainage system, in accordance with this invention, are clear, as are the resulting advantages.

Finally, it is clear that there are numerous other variants which may be introduced to the drainage system, which is the subject of this invention, without for this departing from the innovative principle inherent in the inventive idea, as it is also clear that, in the practical application of the invention, any materials, dimensions and shapes may be utilised in accordance with the requirements and may be substituted with others that are technically equivalent.

The scope of this invention is defined in the attached claims.

What is claimed is:

1. A discharge system for a gas generator including an axial air compressor driven by a gas turbine with a plurality of blades, said compressor and said turbine blades being installed on a common shaft supported by journal bearings including a first bearing located at an inlet to the compressor and a second bearing located between said axial compressor and said turbine, at least one of said bearings being received within a sleeve, said shaft being surrounded by a plurality of supporting means fixed to a housing defining, in part, lateral sump chambers about the bearings, piping for delivery and discharging lubricating and cooling fluid relative to bearing surfaces of said one bearing, said sump chambers receiving a first amount of said lubricating fluid by gravity for flow through said discharge piping, means defining a space about the bearing sleeve having a said second amount of fluid subjected to a differential pressure relative to the pressure of the first fluid existing in said sump chambers, and a plurality of floating seals at the ends of said one bearing creating said differential pressure.

2. A discharge system as claimed in claim 1, including openings in said sleeve for connecting said lateral sump chambers and to said discharge piping.

3. A discharge system as claimed in claim 1, wherein said floating seals comprise two floating rings.

4. A discharge system as claimed in claim 1, wherein said discharge piping is positioned below the bearing and adjacent the center of said sleeve.

* * * * *